May 15, 1928.  
C. H. RASMUSSEN ET AL  
1,670,007  
POWER CAR  
Filed Jan. 23, 1926  
3 Sheets-Sheet 1

Inventor  
C. H. Rasmussen  
J. C. Hoffman  
By Fisher, Moser & Moore  
Attorneys May 15, 1928.  
C. H. RASMUSSEN ET AL  
1,670,007  
POWER CAR  
Filed Jan. 23, 1926   3 Sheets-Sheet 2

Inventor  
C. H. Rasmussen  
J. C. Hoffman

By  
Attorneys

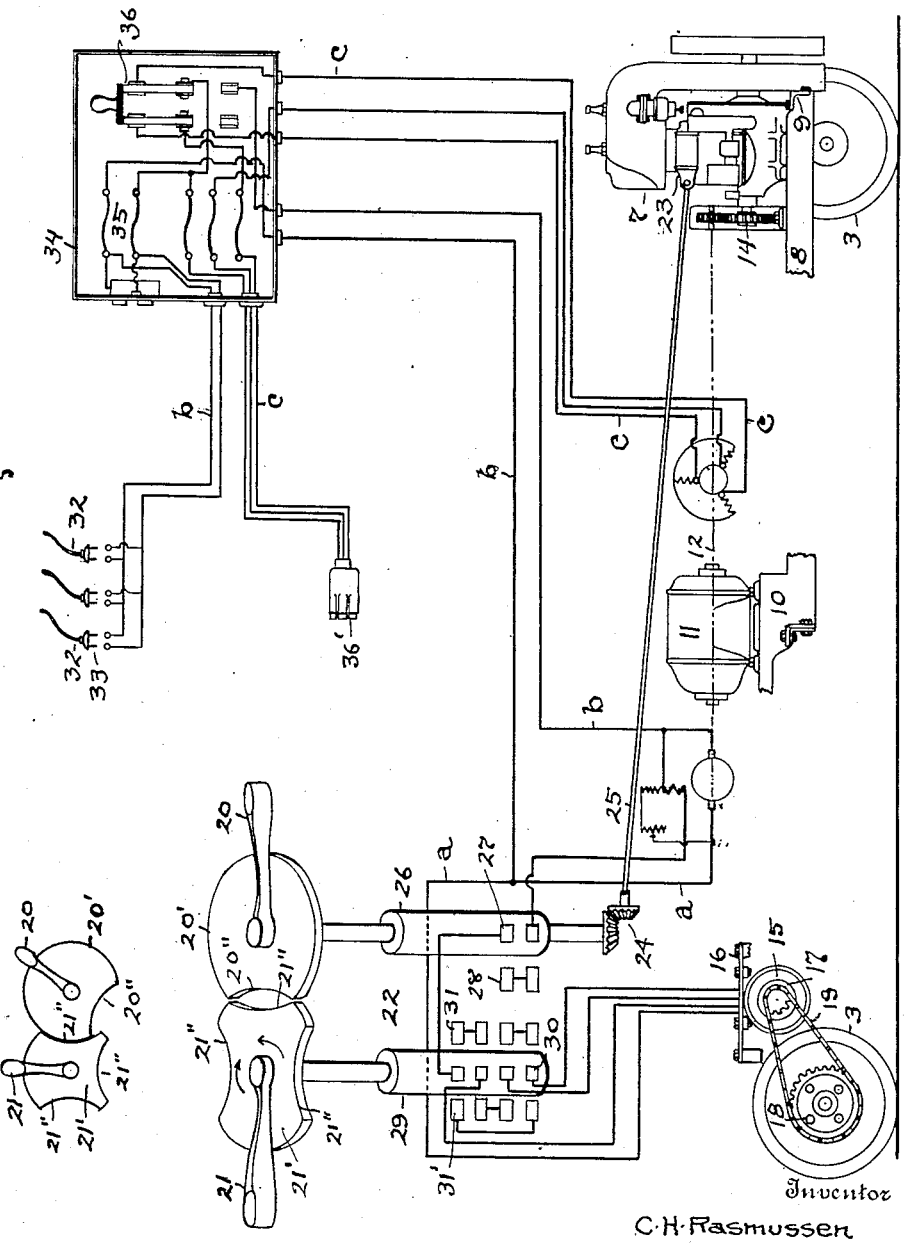

Patented May 15, 1928.

1,670,007

UNITED STATES PATENT OFFICE.

CHRISTIAN H. RASMUSSEN, OF CLEVELAND, AND JAY C. HOFFMAN, OF AKRON, OHIO.

POWER CAR.

Application filed January 23, 1926. Serial No. 83,335.

The present invention relates to an improvement in power cars, the object in general being to provide a vehicle or car embodying a gasoline engine and electric current generating and distributing appliances adapted to be operated by the engine, whereby the car may be either propelled electrically or the electric current utilized to operate any desired electrical appliance or tool when electrically connected with the car. Primarily, the power car is designed for use on railways, although not necessarily limited to such use, and such cars are usually called repair or maintenance cars, being adapted to transport both men and tools to any point on the railway where repairs are needed in the regular course of events or in emergencies such as railway wrecks. Under such conditions it is desirable to have a power unit capable of propelling itself and capable of generating electric power to operate electric lights and tools, and the present device is particularly constructed to provide an easily controlled practical operating power unit for such purposes.

Figure 1:
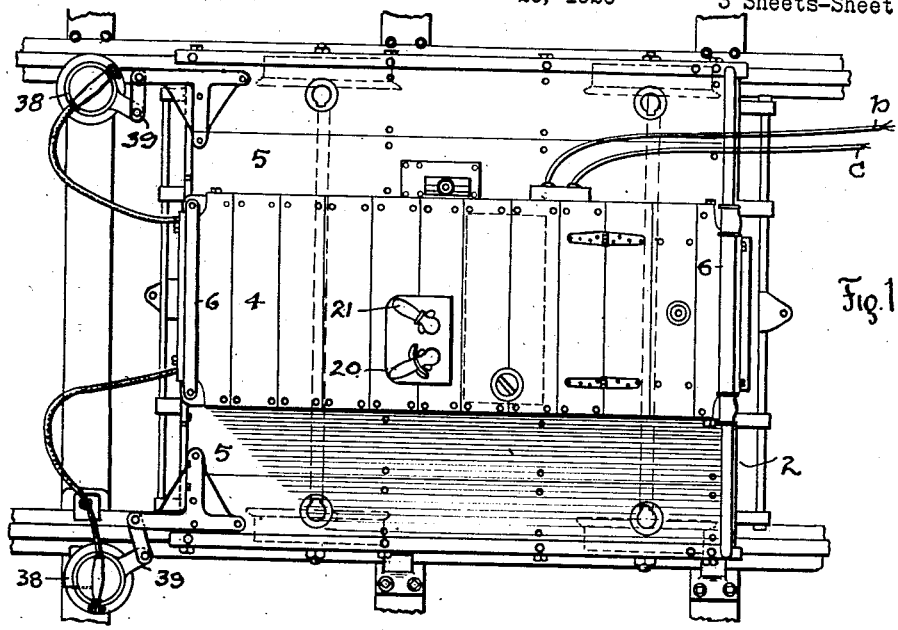
Figure 2:
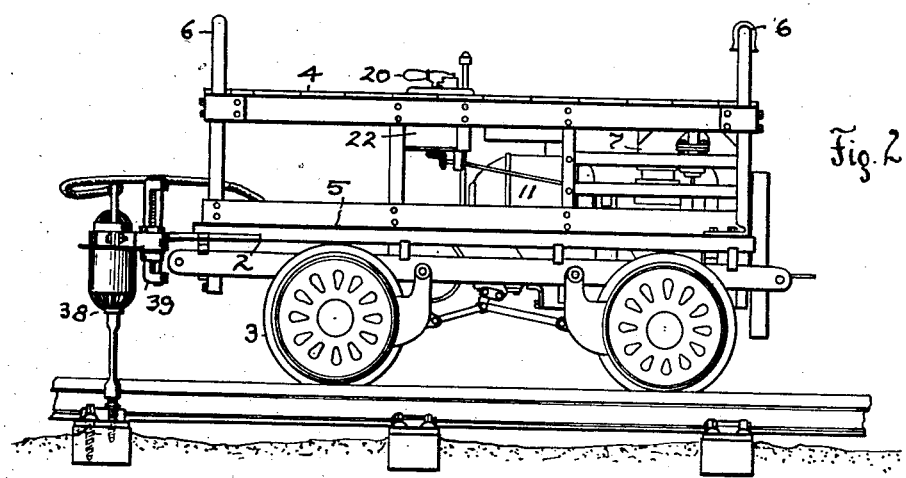
Figure 3:
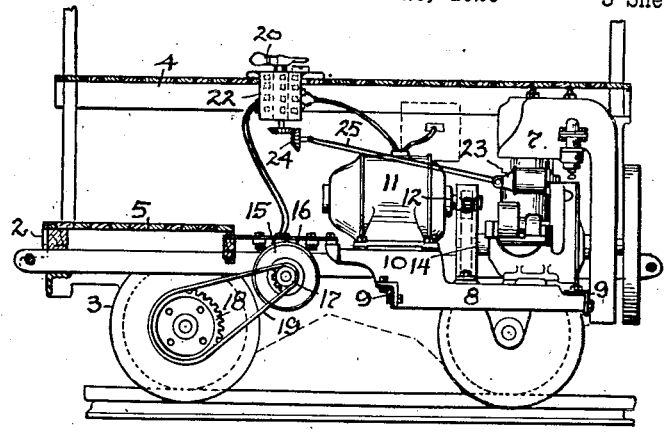
Figure 4:
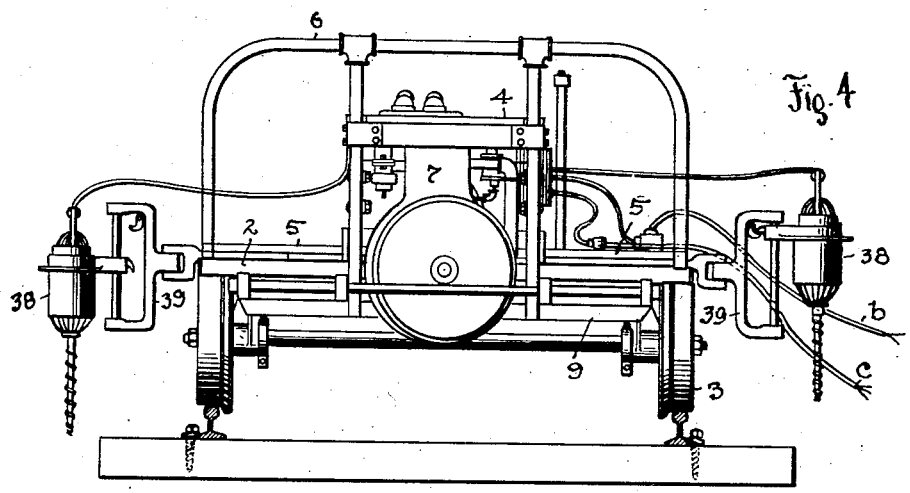

In the accompanying drawings, Fig. 1 is a top view of a power car embodying the invention, and Fig. 2 is a side elevation thereof. Fig. 3 is a longitudinal sectional view vertically through the car, and Fig. 4 is an end elevation, enlarged, of the forward end of the car. Fig. 5 is a diagram of the operating controlling parts for the car, including the electrical circuits therefor. Fig. 6 is a diagram of the devices for controlling the operation of the gasoline engine and the electrical appliances operated by the engine.

The car comprises a frame or body 2 mounted upon wheels 3. The central part 4 of the car is raised in respect to floor or footboard 5, which part 4 provides a deck and riding seat for th operator and working crew. The opposite ends of the car may be provided with hand rails 6. A gasoline engine 7 is mounted upon a supporting frame 8 placed beneath seat 4 at the forward end of the car body, frame 8 being supported by angle irons 9 extending transversely of the car body. The rear end of frame 8 is raised or provided with a pedestal 10 which serves as a base or support for an electric generator 11 having its armature shaft 12 geared to the power shaft 14 of gasoline engine 7 so that generator 11 may be continuously operated when the engine is running. This engine may be of any suitable kind or type and connected to the generator by spiral gears enclosed within an oil-tight casing, and the electric current obtained from generator 11 is utilized to operate an electric motor 15 which is suspended from an extension 16 of frame 8, the engine, generator and motor being supported thereby as a single power unit on frame 8, which is in turn supported upon a chassis or body 2 at separate points, one at the front, and a second, mid-way of the car, to reduce the vibration to a minimum. Motor 15 is connected to the rear wheel axle of the car by sprocket wheels 17 and 18 and a sprocket chain 19, thereby providing transmission connections for the propelment of the car, either forwardly or reversely, the electric motor being reversible, and throttle and reversing levers 20 and 21 respectively, being provided at the top of a controller 22 which is supported or suspended from the deck or seat 4 at about the middle of the car. Throttle lever 20 is connected by suitable operating parts to a rotatable throttle 23, and one form of operating mechanism is shown in Figs. 3 and 5, comprising beveled gearing 24 and connecting rod 25. Throttle 23 governs the speed of the engine and therefore the revolutions of the generator, and the engine throttle lever and the motor reversing lever are mounted closely adjacent each other and provided with positive interlocking devices 20' and 21' respectively so that it is impossible to throw motor 15 across the line except at the lowest engine speed, or in other words, to energize driving motor 15 excepting only when the engine is throttled down and is operating the generator at the lowest engine speed. The interlocking device also prevents the motor from being reversed, excepting only at the lowest engine speed. Thus, the interlocking devices for levers 20 and 21, comprise two circular disks, each disk having one or more circular recesses in its periphery adapted to permit the other disk to be rotated, and as shown disk 20' has a single circular recess 20'' in its corner edge, whereas disk 21' has three notches or recesses 21'' quartered in respect to each other. Throttle lever 20 serves to rotate a shaft or drum 26 having contacts 27 adapted to engage stationary contact members 28 to open and close an electric circuit *a* for direct current motor 15, and reversing lever 21 serves to rotate a shaft or drum 29 having separate sets of contacts 30 which co-act with other contact members 31—31' to reverse the flow of current in circuit *a* alternatively, (see Fig. 5). Reversing lever 21 cannot be rotated to close circuit *a* or to reverse the current unless throttle lever 20 is placed in a neutral position with the notch or recess 20" on its disk 20' diametrically opposite disk 21', and when lever 20 is so placed circuit *a* is open as the contacts 27 and 28 are then separated, while engine 7 is throttled down to its lowest speed. However, when 20 is in neutral position, reversing lever 21 may be turned either to the right or left to bring the contacts 30 into engagement with the contacts 31 and 31' alternatively. When lever 21 is in either of its engaging positions with contacts 31—31' respectively, throttle lever 20 may be rotated more or less to place motor 15 in circuit *a* and at the same time regulate the speed of operation of gasoline engine 7 and electric generator 11; and if lever 21 is in a neutral position which cuts off motor 15 from the source of electric supply, lever 20 may be rotated more or less simply to control throttle 23 and the operation of engine 7. In the latter setting (when lever 20 is rotated in either direction from its neutral position) it is impossible to rotate lever 21 to switch on the electric current to motor 15. Accordingly, generator 11 may be operated safely and exclusively for supplying electric current to other electric appliances or tools when the car is not in motion. To promote that result, a parallel electric circuit *b* is connected to the direct-current supply circuit *a* of generator 11, and one or more electrical conductors 32 for the electrical appliances or tools may be electrically connected to circuit *b* by means of separable attachment plugs 33, (see Fig. 5). A box 34 containing fuses 35 and a double pole switch 36 may be mounted in an accessible position upon car body 2, and switch 36 may be used to cut-off the electric current to the attachment plugs 33, and it may also be employed to throw an alternating current on and off over another circuit *c* having a socket coupling 36' for a three phase alternating current which may be supplied by a single generator 11, for example, a combination generator giving either 2¼ kw., 3 phase, 60 cycle, 110 volts A. C., or 2¼ kw., 110 volts D. C. The A. C. circuit, in Fig. 5, is indicated by the reference letter *c*, and a combination generator of this type is useful inasmuch as a variety of D. C. and A. C. electrical tools and appliances are used on railroads such as rail saws, drills, tie tampers, flood lights, etc.

One form of electrical tool with a special mounting is shown in the drawings, see Figs. 1 to 4. This device comprises a motor driven drilling or screwing device 38 which is slidably supported upon a double jointed swinging yoke 39 attached to the sides or front corners of the car body, and the device may be used to bore openings in the plates or ties at each side of the rail or to drive or screw spikes or screws into the ties.

Internal combustion engine 7 may be of a standard type, air cooled and of any desired horse power, equipped with a float feed carburetor, and using either kerosene or gasoline as a fuel. In operation the engine speed is controlled by throttle lever 20, and the variation in speed of the engine may be arranged to operate the direct-coupled generator so as to produce say 80 volts when control lever 20 closes the circuit for motor 15, and up to 110 volts when at full speed, thereby driving the car at variable speeds, the torque at the motor varying directly as the engine speed, and a dual control being obtained for the throttle of the engine and the motor switch through single lever 20. Motor 15 may be a two H. P., 110 volt D. C. series motor, having characteristics which are such that it will stand 5 H. P. intermittent duty, and giving a speed up to 25 miles per hour without overload.

What we claim, is:

1. A power car, comprising an internal combustion engine controlled by a throttle, an electric generator, driven by said engine, an electric motor operated by said generator for driving said car, and an electric switch for said motor operably connected with said throttle, said engine being only used for driving said generator.

2. A power car, comprising an internal combustion engine having a throttle, an electric generator operated by said engine, an electric motor having electrical connection with said generator, an electric switch for said motor, and a single controller for said switch and throttle, said controller being adapted to control said engine and said motor singly and combined.

3. A power car, comprising an internal combustion engine having a throttle, an electric generator driven by said engine, an electric motor operated by said generator, an electric reversing switch for said motor, and a main electric switch for said motor connected with said throttle, said electric reversing switch being rigidly held against shifting except when the engine is operating at its lowest speed.

4. A power car, comprising an internal combustion engine having a throttle for controlling its speed, an electric generator coupled to said engine, mechanism for propelling said car including an electric motor deriving its current from said generator, and an electric switch coupled to the engine throttle and adapted to energize the motor initially only when the engine is throttled down and is operating the generator at the lower engine speeds.

5. A power car, comprising an engine having a speed governing throttle, an electric generator adapted to be driven continuously by said engine at variable speeds, propelling mechanism for said car including an electric motor electrically connected with said generator, said motor and engine throttle having a single controller, and means co-operating with said controller for safe-guarding the operation of said motor.

6. A power car, comprising an engine having a throttle, an electric generator operably connected with said engine, and electric motor for driving said car, an electric reversing switch and a main switch for controlling said motor, said main switch having operating connection with said engine throttle, and interlocking devices for said switches to prevent the reversing switch from being operated while the main switch is being manipulated.

7. A power car, comprising an engine having a trottle, an electric generator driven by said engine, an electric motor adapted to be operated by said generator, a reversing switch and a main switch for the motor, an operating connection between said main switch and engine throttle, and separate controlling devices for said switches adapted to lock one switch while the other switch is being operated.

8. A power car, comprising a variable speed engine, an electric generator operated by said engine adapted to generate direct and alternating current, an electric motor for propelling said car having direct current connection with said generator, a common controller for the engine and said motor, and separate direct current and alternating current connections upon said car adapted to permit various electrical appliances to be coupled to said generator.

9. A power car, comprising an engine having a throttle, an electric generator coupled to said engine, an electric motor and propelling means for said car, a current supply circuit from said generator to said motor having a main switch and a reversing switch to control the operation of the motor, said main switch being operably connected with the engine throttle, and a second supply circuit from said generator having a switch and detachable coupling connections for supplying electric current to other electrical appliances adapted to be carried upon said car.

In testimony whereof we affix our signatures.

CHRISTIAN H. RASMUSSEN.
JAY C. HOFFMAN.